(12) United States Patent
Anstine (10) Patent No.: US 11,414,550 B2
(45) Date of Patent: Aug. 16, 2022

(54) COMPOSITIONS INCLUDING BLENDS OF HYDROPHOBIC AND NON-HYDROPHOBIC INORGANIC PARTICULATE MATERIAL, FOR USE IN COVERING PRODUCTS

(71) Applicant: Imerys USA, Inc., Roswell, GA (US)

(72) Inventor: David H. Anstine, Canto, GA (US)

(73) Assignee: IMERYS USA, INC., Roswell, GA (US)

( * ) Notice: Subject to any disclaimer, the term of this patent is extended or adjusted under 35 U.S.C. 154(b) by 551 days.

(21) Appl. No.: 15/569,448

(22) PCT Filed: Apr. 25, 2016

(86) PCT No.: PCT/US2016/029123
§ 371 (c)(1),
(2) Date: Oct. 26, 2017

(87) PCT Pub. No.: WO2016/176134
PCT Pub. Date: Nov. 3, 2016

(65) Prior Publication Data
US 2018/0340072 A1 Nov. 29, 2018

Related U.S. Application Data

(60) Provisional application No. 62/159,805, filed on May 11, 2015, provisional application No. 62/153,447, filed on Apr. 27, 2015.

(51) Int. Cl.
*C09C 1/00* (2006.01)
*C09C 1/02* (2006.01)
*H01B 13/00* (2006.01)

(52) U.S. Cl.
CPC .............. *C09C 1/009* (2013.01); *C09C 1/021* (2013.01); *H01B 13/00* (2013.01);
(Continued)

(58) Field of Classification Search
CPC ......... C09C 1/009; C09C 1/021; H01B 13/00; C01P 2004/51; C01P 2004/61; C01P 2006/19
See application file for complete search history.

(56) References Cited

U.S. PATENT DOCUMENTS 4,007,153 A 2/1977 Smith
4,420,341 A 12/1983 Ferrigno
(Continued)

FOREIGN PATENT DOCUMENTS

JP 58-101182 A 6/1983
JP 60-132683 A 7/1985
(Continued)

OTHER PUBLICATIONS

Communication for Application No. 16786963.5-1105 / 3289595, dated Sep. 3, 2018.
(Continued)

*Primary Examiner* — Pegah Parvini
(74) *Attorney, Agent, or Firm* — Finnegan, Henderson, Farabow, Garrett & Dunner LLP (57) ABSTRACT

A mineral filler composition for use in covering products may include first and second inorganic particulate material fillers having respective first and second average particle sizes, wherein the first average particle size is larger than the second average particle size, and wherein at least one of the first and second inorganic particulate material fillers is hydrophobic. A covering product may include a resin and the mineral filler composition. A method for at least one of improving filler loading and water resistance in a covering product including resin, may include providing the mineral filler composition including blended first and second inorganic particulate material fillers, and adding the blended first and second inorganic particulate material fillers to the resin.

16 Claims, 4 Drawing Sheets

(52) U.S. Cl.
CPC ...... *C01P 2004/51* (2013.01); *C01P 2004/61* (2013.01); *C01P 2006/19* (2013.01)

(56) References Cited

U.S. PATENT DOCUMENTS

| | | | | |
|---|---|---|---|---|
| 4,560,712 | A | * 12/1985 | Chiang | ............ C08K 3/26 523/200 |
| 5,693,256 | A | 12/1997 | Sawicki | |
| 5,861,209 | A | * 1/1999 | Haskins | ........ D21H 19/385 428/330 |
| 5,882,396 | A | † 3/1999 | Hiorns | |
| 5,928,754 | A | † 7/1999 | Kondo | |
| 5,929,005 | A | 7/1999 | Smith | |
| 6,323,269 | B1 | † 11/2001 | Skelhorn | |
| 6,682,775 | B2 | * 1/2004 | Calhoun | ............. C08J 5/18 524/425 |
| 6,919,398 | B1 | * 7/2005 | Born | ........... C04B 20/008 524/493 |
| 8,604,123 | B1 | * 12/2013 | Weismann | ......... C08K 3/22 524/539 |
| 8,800,245 | B1 | † 8/2014 | Pien | |
| 2003/0032693 | A1 | 2/2003 | Angeletakis et al. | |
| 2004/0020409 | A1 | 2/2004 | Xiao et al. | |
| 2005/0065240 | A1 | 3/2005 | Kyte et al. | |
| 2009/0156722 | A1 | † 6/2009 | Khanna | |
| 2009/0226662 | A1 | † 9/2009 | Dyczko-Riglin | |
| 2010/0133195 | A1 | * 6/2010 | Gane | .......... B01J 20/043 210/667 |
| 2011/0159290 | A1 | * 6/2011 | Khanna | ............. C08K 9/04 428/403 |
| 2011/0245396 | A1 | 10/2011 | Blanchard et al. | |
| 2012/0196950 | A1 | † 8/2012 | Weismann | |
| 2013/0000518 | A1 | * 1/2013 | Raper | ............. C09D 5/006 106/448 |
| 2013/0266717 | A1 | 10/2013 | Couttenye et al. | |
| 2015/0008369 | A1 | 1/2015 | Anstine et al. | |

FOREIGN PATENT DOCUMENTS

| | | | |
|---|---|---|---|
| JP | 61-89269 A | | 5/1986 |
| JP | 09-038414 | * | 2/1997 ............ B01D 21/01 |
| JP | 9-157545 A | | 6/1997 |
| JP | 2003-27003 A | | 1/2003 |
| JP | 2006-43679 A | | 2/2006 |
| JP | 2010-235885 A | | 10/2010 |
| JP | 2012-72250 A | | 4/2012 |
| JP | 2014-503006 A | | 2/2014 |
| WO | WO 2007/102825 | | 9/2007 |
| WO | WO 2009/094321 A1 | | 7/2009 |

OTHER PUBLICATIONS

International Search Report and Written Opinion dated Jul. 28, 2016, in International Application No. PCT/US2016/029123 (15 pgs.).

Henry Wiebking, Fillers in PVC a Review of the Basics, 4 pages, Nov. 13, 1998, Specialty Minerals Inc., 640 N. 13 St., Easton, PA 18042.†

Shao Yun Fu, Effects of particle size, particle/matrix interface adhesion and particle loading on mechanical properties of particulate polymer composites, 933-961, Jan. 26, 2008, ScienceDirect, Available online at www.sciencedirect.com.†

* cited by examiner
† cited by third party

COMPOSITIONS INCLUDING BLENDS OF HYDROPHOBIC AND NON-HYDROPHOBIC INORGANIC PARTICULATE MATERIAL, FOR USE IN COVERING PRODUCTS

CLAIM OF PRIORITY

This application is a U.S. national phase entry under 35 U.S.C. § 371 from PCT International Application No. PCT/US2016/029123, filed Apr. 25, 2016, which claims the benefit of priority of U.S. Provisional Patent Application No. 62/153,447, filed Apr. 27, 2015, and Provisional Application No. 62/159,805, filed May 11, 2015, to all of which this application claims the benefit of priority, and the entirety of the subject matter of all of which is incorporated herein by reference.

FIELD OF THE DISCLOSURE

Disclosed herein are compositions including blends of hydrophobic and non-hydrophobic inorganic particulate materials for use in covering products, such as, for example, vinyl flooring, luxury vinyl flooring, interior wall or ceiling coverings, such as, for example, geopolymer, thermoplastic, thermoset (e.g., polyester, polyacrylimide, and fiberglass materials), and PVC materials.

BACKGROUND OF THE DISCLOSURE

Decorative covering materials, such as, for example, flooring (e.g., vinyl flooring (e.g., luxury vinyl flooring (LVF))), may include an appearance intended to depict or imitate natural materials. For example, some vinyl flooring may be a composite flooring intended to imitate the look of natural flooring by including images and textures to provide an aesthetically appealing flooring product. Inorganic particulate material fillers may be used in covering products, such as, vinyl flooring products. Filler loading and water resistance are two characteristics that may be important for such fillers. For example, it may be desirable to increase filler loading to reduce the amount of resin in the covering product, for example, to reduce the cost. In addition, water resistance is often desirable because water may cause undesirable swelling and/or deformation of the covering product.

Therefore, it may be desirable to provide improved mineral filler compositions that provide increased filler loading and/or water resistance when incorporated into covering products, such as, for example, LVF.

SUMMARY

According to a first aspect, a mineral filler composition for use in covering products may include a first inorganic particulate material filler having a first average particle size, and a second inorganic particulate material filler having a second average particle size, wherein the first average particle size is larger than the second average particle size, and wherein at least one of the first and second inorganic particulate material fillers is hydrophobic. For example, at least one of the first and second inorganic particulate material fillers treated with at least one surface treatment or is naturally hydrophobic.

According to another aspect, a mineral filler composition for use in vinyl flooring products may include a first inorganic particulate material filler having a first average particle size, and a second inorganic particulate material filler having a second average particle size, wherein the first average particle size is larger than the second average particle size, and wherein the second inorganic particulate material filler is treated with at least one surface treatment.

According to a further aspect, a covering product may include a resin and a mineral filler composition including a first inorganic particulate material filler having a first average particle size, and a second inorganic particulate material filler having a second average particle size, wherein the first average particle size is larger than the second average particle size, and wherein at least one of the first and second inorganic particulate material fillers is hydrophobic.

According to still another aspect, a vinyl flooring product may include a resin and a mineral filler composition including a first inorganic particulate material filler having a first average particle size, and a second inorganic particulate material filler having a second average particle size, wherein the first average particle size is larger than the second average particle size, and wherein the second inorganic particulate material filler is treated with at least one surface treatment.

According to yet another aspect, a method for at least one of improving filler loading and water resistance in a covering product including resin, may include providing a first inorganic particulate material filler having a first average particle size, and providing a second inorganic particulate material filler having a second average size, wherein the first average particle size is larger than the second average particle size, and wherein at least one of first and second inorganic particulate material fillers is hydrophobic. The method may further include blending the first inorganic particulate material filler with the second inorganic particulate material filler. The method may also include adding the blended first and second inorganic particulate material fillers to the resin.

According to another aspect, a method for at least one of improving filler loading and water resistance in a vinyl flooring product including resin, may include providing a first inorganic particulate material filler having a first average particle size, and providing a second inorganic particulate material filler having a second average size, wherein the first average particle size is larger than the second average particle size. The method may further include treating the second inorganic particulate material filler with at least one surface treatment, and blending the first inorganic particulate material filler with the treated second inorganic particulate material filler. The method may also include adding the blended first and second inorganic particulate material fillers to the resin.

DESCRIPTION OF EXEMPLARY EMBODIMENTS

According to some embodiments, a mineral filler composition for use in covering products may include a first inorganic particulate material filler having a first average particle size, and a second inorganic particulate material filler having a second average particle size, wherein the first average particle size is larger than the second average particle size, and wherein at least one of the first and second inorganic particulate material fillers is hydrophobic. For example, at least one of the first and second inorganic particulate material fillers treated with at least one surface treatment or is naturally hydrophobic.

According to some embodiments, the mineral filler composition including the at least one hydrophobic inorganic particulate material filler may have a lower oil absorption relative to a mineral filler composition that does not include a hydrophobic inorganic particulate material filler. For example, the mineral filler composition including the at least one hydrophobic inorganic particulate material filler may have at least a 1 percent lower oil absorption relative to a mineral filler composition that does not include a hydrophobic inorganic particulate material filler, for instance, at least a 20 percent lower oil absorption relative to a mineral filler composition that does not include a hydrophobic inorganic particulate material filler. For example, the mineral filler composition including the at least one hydrophobic inorganic particulate material filler may have at least a 30 percent lower oil absorption relative to a mineral filler composition that does not include a hydrophobic inorganic particulate material filler, for example, at least a 40 percent lower oil absorption relative to a mineral filler composition that does not include a hydrophobic inorganic particulate material filler.

According to some embodiments, the second inorganic particulate material filler is hydrophobic, and a blend ratio of the first inorganic particulate material filler to the second inorganic particulate material filler may range from 99:1 to 1:99. For example, the blend ratio of the first inorganic particulate material filler to the second inorganic particulate material filler may range from 85:15 to 45:55, may range from 75:25 to 45:55, or, for example, may range from 70:30 to 60:40.

According to some embodiments, at least one of the first and second inorganic particulate mineral fillers is treated with stearic acid. According to some embodiments, at least one of the first and second inorganic particulate mineral fillers is treated with at least one of fatty acids, salts thereof, esters thereof, silicone oil, silane, and/or siloxane.

According to some embodiments, a mineral filler composition for use in flooring products, for example, luxury vinyl flooring, may include a first inorganic particulate material filler having a first average particle size, and a second inorganic particulate material filler having a second average particle size. The first average particle size may be larger than the second average particle size, and the second inorganic particulate material filler may be treated with at least one surface treatment.

According to some embodiments, the mineral filler composition including the second inorganic particulate material filler may have a lower oil absorption relative to a mineral filler composition including the first inorganic particulate material filler but not including the second inorganic particulate material filler. For example, the mineral filler composition including the second inorganic particulate material filler may have at least a 1 percent lower oil absorption relative to a mineral filler composition that does not include a hydrophobic inorganic particulate material filler, for instance, at least a 20 percent lower oil absorption relative to a mineral filler composition including the first inorganic particulate material filler but not including the second inorganic particulate material filler. For example, the mineral filler composition including the second inorganic particulate material filler may have at least a 30 percent lower oil absorption relative to a mineral filler composition including the first inorganic particulate material filler but not including the second inorganic particulate material filler, for example, at least a 40 percent lower oil absorption relative to a mineral filler composition including the first inorganic particulate material filler but not including the second inorganic particulate material filler.

According to some embodiments, the mineral filler composition may have an oil absorption ranging from 9 to 20 grams of oil per 100 grams of the mineral filler composition. For example, the mineral filler composition may have an oil absorption ranging from 9 to 19 grams of oil per 100 grams of the mineral filer composition, an oil absorption ranging from 9 to 18 grams of oil per 100 grams of the mineral filer composition, an oil absorption ranging from 9 to 17 grams of oil per 100 grams of the mineral filer composition, an oil absorption ranging from 9 to 16 grams of oil per 100 grams of the mineral filer composition, an oil absorption ranging from 9 to 15 grams of oil per 100 grams of the mineral filer composition, an oil absorption ranging from 9 to 14 grams of oil per 100 grams of the mineral filer composition, an oil absorption ranging from 9 to 13 grams of oil per 100 grams of the mineral filer composition, an oil absorption ranging from 9 to 12 grams of oil per 100 grams of the mineral filer composition, or an oil absorption ranging from 9 to 11 grams of oil per 100 grams of the mineral filer composition. According to some embodiments, the mineral filler composition may have an oil absorption ranging from 9 to 15 grams of oil per 100 grams of the mineral filer composition, an oil absorption ranging from 9 to 14 grams of oil per 100 grams of the mineral filler composition, an oil absorption ranging from 9 to 12 grams of oil per 100 grams of the mineral filler composition, or, for example, an oil absorption ranging from 9 to 11 grams of oil per 100 grams of the mineral filler composition.

According to some embodiments, a blend ratio of the first inorganic particulate material filler to the second inorganic particulate material filler may range from 99:1 to 1:99. For example, the blend ratio of the first inorganic particulate material filler to the second inorganic particulate material filler may range from 85:15 to 45:55, may range from 75:25 to 45:55, or, for example, may range from 70:30 to 60:40.

According to some embodiments, at least one of the first inorganic particulate mineral filler and the second inorganic particulate mineral filler may include calcium carbonate. For example, at least one of the first inorganic particulate mineral filler and the second inorganic particulate mineral filler may include ground calcium carbonate. According to some embodiments, at least one of the first inorganic particulate mineral filler and the second inorganic particulate mineral filler may include precipitated calcium carbonate. According to some embodiments, one of the first inorganic particulate mineral filler and the second inorganic particulate mineral filler may include ground calcium carbonate, and the other of the first inorganic particulate mineral filler and the second inorganic particulate mineral filler may include precipitated calcium carbonate.

According to some embodiments, the second inorganic particulate mineral filler is treated with stearic acid. According to some embodiments, the second inorganic particulate mineral filler is treated with at least one of fatty acids, salts thereof, esters thereof, silicone oil, silane, and/or siloxane.

According to some embodiments, the first inorganic particulate material filler may have an average particle size of at least 3 microns, such as, for example, at least 5 microns, at least 8 microns, at least 10 microns, at least 15 microns, at least 20 microns, at least 25 microns, at least 30 microns, at least 35 microns, or at least 40 microns. According to some embodiments, the second inorganic particulate material filler may have an average particle size of less than or equal to 10 microns, such as, for example, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. According to some embodiments, the first inorganic particulate material filler may have an average particle size of at least 20 microns, and the second inorganic particulate material filler may have an average particle size of less than or equal to 3 microns.

According to some embodiments, a covering product may include a resin and a mineral filler composition including a first inorganic particulate material filler having a first average particle size, and a second inorganic particulate material filler having a second average particle size. The first average particle size may be relatively larger than the second average particle size. According to some embodiments, at least one of the first and second inorganic particulate material fillers may be hydrophobic. According to some embodiments, the covering product may be a luxury vinyl flooring product.

According to some embodiments of the covering product, the mineral filler composition including the at least one hydrophobic inorganic particulate material filler may have a lower oil absorption relative to a mineral filler composition that does not include a hydrophobic inorganic particulate material filler. For example, the mineral filler composition including the at least one hydrophobic inorganic particulate material filler may have at least a 1 percent lower oil absorption relative to a mineral filler composition that does not include a hydrophobic inorganic particulate material filler, for instance, at least a 20 percent lower oil absorption relative to a mineral filler composition that does not include a hydrophobic inorganic particulate material filler. For example, the mineral filler composition including the at least one hydrophobic inorganic particulate material filler may have at least a 30 percent lower oil absorption relative to a mineral filler composition that does not include a hydrophobic inorganic particulate material filler, for example, at least a 40 percent lower oil absorption relative to a mineral filler composition that does not include a hydrophobic inorganic particulate material filler.

According to some embodiments of the covering product, the second inorganic particulate material filler is hydrophobic, and a blend ratio of the first inorganic particulate material filler to the second inorganic particulate material filler may range from 99:1 to 1:99. For example, the blend ratio of the first inorganic particulate material filler to the second inorganic particulate material filler may range from 85:15 to 45:55, may range from 75:25 to 45:55, or, for example, may range from 70:30 to 60:40.

According to some embodiments of the covering product, at least one of the first and second inorganic particulate mineral fillers is treated with stearic acid. According to some embodiments, at least one of the first and second inorganic particulate mineral fillers is treated with at least one of fatty acids, salts thereof, esters thereof, silicone oil, silane, and/or siloxane.

According to some embodiments of the covering product, the first inorganic particulate material filler may have an average particle size of at least 3 microns, such as, for example, at least 5 microns, at least 8 microns, at least 10 microns, at least 15 microns, at least 20 microns, at least 25 microns, at least 30 microns, at least 35 microns, or at least 40 microns. According to some embodiments, the second inorganic particulate material filler may have an average particle size of less than or equal to 10 microns, such as, for example, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. According to some embodiments, the first inorganic particulate material filler may have an average particle size of at least 20 microns, and the second inorganic particulate material filler may have an average particle size of less than or equal to 3 microns.

According to some embodiments, a vinyl flooring product may include a resin and a mineral filler composition including a first inorganic particulate material filler having a first average particle size, and a second inorganic particulate material filler having a second average particle size. The first average particle size may be relatively larger than the second average particle size. According to some embodiments, the second inorganic particulate material filler may be treated with at least one surface treatment. For example, the flooring product may be a luxury vinyl flooring product. According to some embodiments, the luxury vinyl flooring product may include a top layer configured for scratch- or scuff-resistance and a second layer including a clear or translucent film configured to provide protection from harder impact and/or damage, such as, for example, rips and tears. The vinyl flooring product may also include a design layer including a photographic representation configured to imitate a natural material, such as, for example, stone or wood. The vinyl flooring product may also include a backing layer configured to provide the vinyl flooring product with structure and support for the remaining layers. According to some embodiments, the backing layer may have a thickness up to about ninety percent of the total thickness of the vinyl flooring product. According to some embodiments, the backing layer may include the mineral filler composition for use in vinyl flooring products that includes a first inorganic particulate material filler having a first average particle size, and a second inorganic particulate material filler having a relatively smaller second average particle size.

According to some embodiments of the flooring product, the mineral filler composition including the second inorganic particulate material filler may have at least a 1 percent lower oil absorption relative to a mineral filler composition that does not include a hydrophobic inorganic particulate material filler, for instance, at least a 20 percent lower oil absorption relative to a mineral filler composition including the first inorganic particulate material filler but not including the second inorganic particulate material filler. For example, the mineral filler composition including the second inorganic particulate material filler may have at least a 30 percent lower oil absorption relative to a mineral filler composition including the first inorganic particulate material filler but not including the second inorganic particulate material filler, or, for example, at least a 40 percent lower oil absorption relative to a mineral filler composition including the first inorganic particulate material filler but not including the second inorganic particulate material filler.

According to some embodiments of the flooring product, the mineral filler composition may have an oil absorption ranging from 9 to 20 grams of oil per 100 grams of the mineral filler composition. For example, the mineral filler composition may have an oil absorption ranging from 9 to 19 grams of oil per 100 grams of the mineral filer composition, an oil absorption ranging from 9 to 18 grams of oil per 100 grams of the mineral filer composition, an oil absorption ranging from 9 to 17 grams of oil per 100 grams of the mineral filer composition, an oil absorption ranging from 9 to 16 grams of oil per 100 grams of the mineral filer composition, an oil absorption ranging from 9 to 15 grams of oil per 100 grams of the mineral filer composition, an oil absorption ranging from 9 to 14 grams of oil per 100 grams of the mineral filer composition, an oil absorption ranging from 9 to 13 grams of oil per 100 grams of the mineral filer composition, an oil absorption ranging from 9 to 12 grams of oil per 100 grams of the mineral filer composition, or an oil absorption ranging from 9 to 11 grams of oil per 100 grams of the mineral filer composition. According to some embodiments, the mineral filler composition may have an oil absorption ranging from 9 to 15 grams of oil per 100 grams of the mineral filler composition, ranging from 9 to 14 grams of oil per 100 grams of the mineral filler composition, ranging from 9 to 12 grams of oil per 100 grams of the mineral filler composition, or, for example, ranging from 9 to 11 grams of oil per 100 grams of the mineral filler composition.

According to some embodiments of the flooring product, a blend ratio of the first inorganic particulate material filler to the second inorganic particulate material filler may range from 99:1 to 1:99. For example, the blend ratio may range from 85:15 to 45:55, from 75:25 to 45:55, or, for example, from 70:30 to 60:40.

According to some embodiments of the flooring product, at least one of the first inorganic particulate mineral filler and the second inorganic particulate mineral filler may include calcium carbonate. For example, at least one of the first inorganic particulate mineral filler and the second inorganic particulate mineral filler may include ground calcium carbonate. According to some embodiments, at least one of the first inorganic particulate mineral filler and the second inorganic particulate mineral filler may include precipitated calcium carbonate. According to some embodiments, one of the first inorganic particulate mineral filler and the second inorganic particulate mineral filler may include ground calcium carbonate, and the other of the first inorganic particulate mineral filler and the second inorganic particulate mineral filler may include precipitated calcium carbonate.

According to some embodiments of the flooring product, the second inorganic particulate mineral filler is treated with stearic acid. According to some embodiments, the second inorganic particulate mineral filler is treated with at least one of fatty acids, salts thereof, esters thereof, silicone oil, silane, and/or siloxane.

According to some embodiments of the flooring product, the first inorganic particulate material filler may have an average particle size of at least 3 microns, such as, for example, at least 5 microns, at least 8 microns, at least 10 microns, at least 15 microns, at least 20 microns, at least 25 microns, at least 30 microns, at least 35 microns, or at least 40 microns. According to some embodiments, the second inorganic particulate material filler may have an average particle size of less than or equal to 10 microns, such as, for example, less than or equal to 8 microns, less than or equal to 7 microns, less than or equal to 6 microns, less than or equal to 5 microns, less than or equal to 4 microns, less than or equal to 3 microns, less than or equal to 2 microns, or less than or equal to 1 micron. According to some embodiments, the first inorganic particulate material filler may have an average particle size of at least 20 microns, and the second inorganic particulate material filler may have an average particle size of less than or equal to 3 microns.

According to some embodiments, a method for at least one of improving filler loading and water resistance in a covering product including resin, may include providing a first inorganic particulate material filler having a first average particle size and providing a second inorganic particulate material filler having a second average particle size, wherein the first average particle size is larger than the second average particle size, and wherein at least one of the first and second inorganic particulate material fillers is hydrophobic. The method may further include blending the first inorganic particulate material filler with the second inorganic particulate material filler. The method may further include adding the blended first and second inorganic particulate material fillers to the resin.

According to some embodiments, a method for at least one of improving filler loading and water resistance in a vinyl flooring product including resin, may include providing a first inorganic particulate material filler having a first average particle size and providing a second inorganic particulate material filler having a second average particle size, wherein the first average particle size is larger than the second average particle size. The method may further include treating the second inorganic particulate material filler with at least one surface treatment, and blending the first inorganic particulate material filler with the treated second inorganic particulate material filler. The method may further include adding the blended first and second inorganic particulate material fillers to the resin.

According to some embodiments, the mineral filler composition may exhibit improved particle packing resulting in a relatively more hydrophobic and/or water resistant and/or moisture tolerant backing layer in covering products, such as, for example, vinyl flooring. For example, the hydrophobicity may be improved by at least 1%, 5%, or 10% (e.g., the contact angle may be increased by corresponding percentages). According to some embodiments, the mineral filler composition may result in the ability to increase filler loading in covering products. For example, the filler loading may be increased by at least 1%. This may permit the use of relatively less polymer in the covering products. According to some embodiments, the mineral filler composition may have a relatively lower oil absorption, which may often be consistent with less polymer demand, which corresponds to an ability to increase filler loading. For example, the oil absorption may be reduced by at least 1%, 5%, 10%, 15%, 20%, 25%, 30%, 35%, 40%, 45%, 50%, 55%, 60%, 65%, 70%, 75%, 80%, or 85%. According to some embodiments, the mineral filler composition may provide improved flexural strength and/or impact strength, dimensional stability, thermoconductivity increase, equivalent stiffness with thinner material of the covering products, such as, for example, vinyl flooring products (e.g., the backing layer of vinyl flooring products). According to some embodiments, for a printed layer of a covering product, such as, for example, a printed layer of a flooring product, the mineral filler composition may provide improved flexural strength and/or impact strength, dimensional stability, thermoconductivity increase, equivalent stiffness with thinner material of the covering product. For example, the flexural strength and/or impact strength, dimensional stability, and/or thermoconductivity may be increased by at least 1%.

A covering product such as a flooring product may include an inorganic particulate material filler (e.g., a mineral) treated with at least one surface treatment and a base material. The at least one surface treatment may include at least one of a fatty acid, a salt thereof, or an ester thereof, silicone oil, silane, or siloxane. The at least one surface treatment may impart hydrophobic or water-repellant properties to the inorganic particulate material.

In certain embodiments, the covering product may be in the form of a dry powder that is adapted to be mixed with water before application. In other embodiments, the covering product may be in a "ready-mixed" form wherein the base material may include water.

In particular embodiments, the inorganic particulate material may include calcium carbonate, such as, for example, marble or limestone (e.g., ground calcite or ground dolomite). In some embodiments, the inorganic particulate material may include lime. Hereafter, certain embodiments of the invention may tend to be discussed in terms of calcium carbonate, and in relation to aspects where the calcium carbonate is processed and/or treated. The invention should not be construed as being limited to such embodiments. For instance, calcium carbonate may be replaced, either in whole or in part, with, for example, talc, and/or lime.

In certain embodiments, at least one surface treatment is used to modify the surface of the inorganic particulate material. In one embodiment, the at least one surface treatment at least partially chemically modifies the surface of the inorganic particulate material by way of at least one surface treating agent. Chemical modification includes, but is not limited to, covalent bonding, ionic bonding, and "weak" intermolecular bonding, such as van der Waals' interactions. In some embodiments, the at least one surface treatment at least partially physically modifies the surface of the inorganic particulate material. Physical modification includes, but is not limited to, roughening of the material surface, pitting the material surface, or increasing the surface area of the material surface. In further embodiments, the at least one surface treatment at least partially chemically modifies and at least partially physically modifies the surface of the inorganic particulate material. In yet other embodiments, the at least one surface treatment is any chemical or physical modification to the surface of the inorganic particulate material.

In certain embodiments, the at least one fatty acid, salt thereof, or ester thereof may be one or more fatty acid, salt thereof, or ester thereof with a chain length of C16 or greater. The fatty acid may, for example, be stearic acid.

In some embodiments, the at least one surface treatment silanizes the inorganic particulate material. The silanizing surface treatment may include at least one siloxane. In general, siloxanes are any of a class of organic or inorganic chemical compounds comprising silicon, oxygen, and often carbon and hydrogen, based on the general empirical formula of $R_2SiO$, where R may be an alkyl group. Exemplary siloxanes include, but are not limited to, dimethylsiloxane, methylphenylsiloxane, methylhydrogen siloxane, methylhydrogen polysiloxane, methyltrimethoxysilane, octamethylcyclotetrasiloxane, hexamethyldisiloxane, diphenylsiloxane, and copolymers or blends of copolymers of any combination of monophenylsiloxane units, diphenylsiloxane units, phenylmethylsiloxane units, dimethylsiloxane units, monomethylsiloxane units, vinylsiloxane units, phenylvinylsiloxane units, methylvinylsiloxane units, ethylsiloxane units, phenylethylsiloxane units, ethylmethylsiloxane units, ethylvinylsiloxane units, or diethylsiloxane units.

In some embodiments, the silanizing surface treatment may include at least one silane. In general, silanes and other monomeric silicon compounds have the ability to bond to inorganic materials, such as the inorganic particulate material. The bonding mechanism may be aided by two groups in the silane structure, where, for example, the $Si(OR_3)$ portion interacts with the inorganic particulate material, while the organofunctional (vinyl-, amino-, epoxy-, etc.) group may interact with other materials.

In some embodiments, the inorganic particulate material is subjected to at least one surface treatment surface-treated with at least one ionic silane. Exemplary ionic silanes include, but are not limited to, 3-(trimethoxysilyl) propylethylenediamine triacetic acid trisodium salt and 3-(trihydroxysilyl)propylmethylposphonate salt. In some embodiments, the inorganic particulate material is subjected to at least one surface treatment with at least one nonionic silane.

In further embodiments, the inorganic particulate material is subjected to at least one surface treatment with at least one silane of Formula (I):

$$(R^1)_x Si(R^2)_{3-x} R^3 \qquad (I)$$

wherein:
R$^1$ is any hydrolysable moiety that may chemically react with any active group on the surface of the inorganic particulate material, including, but not limited to, alkoxy, halogen, hydroxy, aryloxy, amino, amide, methacrylate, mercapto, carbonyl, urethane, pyrrole, carboxy, cyano, aminoacyl, acylamino, alkyl ester, and aryl ester;

X has a value between 1 and 3, such that more than one siloxane bond may be formed between the inorganic particulate material and the at least one silane;

R$^2$ is any carbon-bearing moiety that does not substantially react or interact with the inorganic particulate material during the treatment process, including, but not limited to, substituted or unsubstituted alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, and arylalkaryl;

R$^3$ is any organic-containing moiety that remains substantially chemically attached to the silicon atom of Formula (I) once the at least one surface treatment is completed and that is capable of reacting or interacting with an active ingredient, such as, but not limited to, hydrogen, alkyl, alkenyl, alkaryl, alkcycloalkyl, aryl, cycloalkyl, cycloalkenyl, heteroaryl, heterocyclic, cycloalkaryl, cycloalkenylaryl, alkcycloalkaryl, alkcycloalkenyaryl, arylalkaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by, for example, halogen, hydroxy, amino, carboxy, or cyano.

In some embodiments, the inorganic particulate material with a hydroxyl-bearing porous surface is subjected to at least one surface treatment with at least one silane, such that the inorganic particulate material surface is chemically bonded to the at least one silane. In such embodiments, the surface area of the inorganic particulate material may limit the amount of the bound silane. As a result, it may be preferable to subject the inorganic particulate material to at least one physical surface treatment that increases the surface area of the inorganic particulate material prior to treatment with the at least one silane.

In some embodiments, silanization may proceed according to "wet" or "dry" processes known to the skilled artisan.

For example, a "wet" process generally includes reacting the at least one silane onto the inorganic particulate material in at least one solvent (e.g., organic solvent or water). In some embodiments, heat may be used in place of, or in addition to, the at least one solvent. Although heat and solvents are not required for a "wet" process, they may improve the reaction rate and promote uniform surface coverage of the treatment. In some embodiments, a "wet" process includes in-line mixing of slurries or liquids during typical silanization processing steps, including but not limited to filtration and drying.

In some embodiments, a "dry" silanization process generally includes reacting at least one silane with the inorganic particulate material in a vapor phase by mixing the at least one silane with the inorganic particulate material and then heating the mixture. In some embodiments, a "dry" silanization process includes reacting at least one silane with the inorganic particulate material in a stirred liquid phase by mixing the at least one silane with the inorganic particulate material and then heating the mixture. In still other embodiments, a "dry" silanization process includes mixing at least one silane with the inorganic particulate material and incubating in a sealed container at elevated temperatures to speed up the surface treatment process. In yet other embodiments, the "dry" silanization process includes mixing the inorganic particulate material and a liquid silane additive, where the amount of silane added is small enough that the reaction mass remains solid-like and can continue to be processed like a dry particulate material.

In some embodiments, the inorganic particulate material is subjected to at least one surface treatment with at least one silane by adding the at least one silane gradually to a rapidly stirred solvent, which is in direct contact with the inorganic particulate material. In some embodiments, the inorganic particulate material is subjected to at least one surface treatment with at least one silane by carrying out the treatment in a vapor phase, which causes the vapor of the at least one silane to contact and react with the inorganic particulate material.

According to some embodiments, a surface treatment, such as, for example, silicone oil, siloxane, or silane, may polymerize onto the inorganic particulate material. The treated inorganic particulate material may then be deagglomerated, if desired.

In certain embodiments, the inorganic particulate material may have a Hegman of about 5.5 or less, as measured by ASTM D1210.

In some embodiments, the inorganic particulate material may have a brightness of 95 or less, as measured using Hunter Colorimeter Models D-25A-9 or DP 9000.

In some embodiments, the inorganic particulate material may have a BET surface area of at least about 0.3 square meters/gram. For example, the inorganic particulate material may have a BET surface area of at least about 0.4 square meters/gram, at least about 0.5 square meters/gram, or at least about 0.6 square meters/gram.

In some embodiments, the inorganic particulate material may be a ground inorganic particulate material, such as a dry ground treated inorganic particulate material or a wet ground treated inorganic particulate material.

In certain embodiments, the covering product (e.g., a flooring product) may also include an untreated inorganic particulate material (e.g., a base material) blended with the treated inorganic particulate material. In particular embodiments, the covering product (e.g., a flooring product including a backing layer) may include a blend of coarse untreated inorganic particulate material such as, for example, talc, limestone (e.g., ground calcium carbonate (GCC), ground calcite, and/or ground dolomite), chalk, marble, and fine treated inorganic particulate material, such as talc, lime, and/or limestone (e.g., GCC, ground calcite, and/or ground dolomite). In other embodiments, the untreated inorganic particulate may include lime, gypsum, diatomaceous earth, perlite, hydrous and/or calcined kaolin, attapulgite, bentonite, montmorillonite, feldspar, wollastonite, mica, vermiculite, halloysite, quartz, and other natural or synthetic clays. In some embodiments, blending a fine treated ground limestone with a coarser untreated limestone results in filler composition that exhibits some hydrophobic properties and less caking when put in contact with water versus untreated limestone alone.

In some embodiments, the untreated inorganic particulate material may be ground inorganic particulate material, such as a dry ground inorganic particulate material or a wet ground inorganic particulate material.

In some embodiments, the blended treated inorganic particulate material and untreated inorganic particulate material has a range of contact angles from about 10 to about 150 degrees. According to some embodiments, the blended material has a range of contact angles from about 25 to about 125 degrees, from about 50 to about 100 degrees, or from 90 to about 150 degrees.

Without wishing to be bound by a particular theory, it is believed that the ratio of the treated inorganic particulate material to untreated inorganic particulate material may be proportioned to vary the amount of un-reacted surface treatment in the blends. In certain embodiments, surface-treated ground calcium carbonate may be used to provide a hydrophobic property to the covering product (e.g., a flooring product backing layer). Without wishing to be bound by a particular theory, addition of a surface treatment, such as stearic acid, may result in minimal "free acid" after treatment. The reaction of stearic acid with the limestone surface may create calcium or magnesium stearate. The melting point of stearic acid is approximately 157° F. (69.4° C.), and the melting point of calcium stearate is approximately 311° F. (155° C.).

According to some embodiments, calcium carbonate is combined (e.g., blended) at room temperature with stearic acid (or salts thereof, esters thereof, or mixtures thereof) and water in an amount greater than about 0.1% by weight relative to the total weight of the mixture (e.g., in the form of a cake-mix). The mixture may be blended at a temperature sufficient for at least a portion of the stearic acid to react (e.g., sufficient for a majority of the stearic acid to react with at least a portion of the calcium carbonate). For instance, the mixture may be blended at a temperature sufficient, such that at least a portion of the stearic acid may coat at least a portion of the calcium carbonate (e.g., the surface of the calcium carbonate).

In some embodiments, the mixture may be blended at a temperature high enough to melt the stearic acid. For example, the mixture may be blended at a temperature ranging from about 149° F. (65° C.) to about 392° F. (200° C.). In other embodiments, the mixture may be blended at a temperature ranging from about 149° F. (65° C.) to about 302° F. (150° C.), for example, at about 248° F. (120° C.). In further embodiments, the mixture may be blended at a temperature ranging from about 149° F. (65° C.) to about 212° F. (100° C.). In still other embodiments, the mixture may be blended at a temperature ranging from about 149° F. (65° C.) to about 194° F. (90° C.). In further embodiments, the mixture may be blended at a temperature ranging from about 158° F. (70° C.) to about 194° F. (90° C.).

In certain embodiments, the amount of surface treatment may be combined with the inorganic particulate material, such as, for example, calcium carbonate, below, at, or in excess of, a monolayer concentration. "Monolayer concentration," as used herein, refers to an amount sufficient to form a monolayer on the surface of the inorganic particles. Such values will be readily calculable to one skilled in the art based on, for example, the surface area of the inorganic particles.

In some embodiments, the surface treatment may be added to calcium carbonate in an amount greater than or equal to about one times the monolayer concentration. In other embodiments, the surface treatment may be added in an amount in excess of about one times the monolayer concentration, for example, two times to six times the monolayer concentration.

Also, without wishing to be bound by a particular theory, the median or average particle sizes of the coarse untreated portions of the flooring product (e.g., the backing layer) may be chosen based on their potential to pack with the median or average particle size of the specific treated fine portions of the calcium carbonate used in that blend. The advantage of blending the smaller particles with the larger particles is that the voids between the larger particles that would wick moisture into the blend are reduced or avoided. In certain embodiments, particle-packing practice may be used to inhibit the wicking action of surface water through the compositions.

In certain embodiments, the inorganic particles may be characterized by a mean particle size ($d_{50}$) value, defined as the size at which 50 percent of the calcium carbonate particles have a diameter less than or equal to the stated value. Particle size measurements, such as $d_{50}$, may be carried out by any means now or hereafter known to those having ordinary skill in the art.

Particle sizes, and other particle size properties, of the untreated inorganic particulate material referred to in the present disclosure, may be measured using a SEDIGRAPH 5100 instrument, as supplied by Micromeritics Corporation. The size of a given particle is expressed in terms of the diameter of a sphere of equivalent diameter, which sediments through the suspension, i.e., an equivalent spherical diameter or esd.

The particle size and other particle size properties of the treated inorganic particulate material may be determined by a Microtrac Model X100 Particle Size Analyzer, as supplied by Microtrac. The Microtrac analysis determines particle size based on the number distribution of particles using a laser light scattering technique.

In some embodiments, the particle size as determined by SEDIGRAPH 5100 may not be the same as that determined by a Microtrac Model X100 Particle Size Analyzer. The difference may be due to the different methods used by each instrument to determine the particle size. The SEDIGRAPH 5100 measures the sedimentation of particles over time, whereas the Microtrac Model X100 Particle Size Analyzer analyzes a laser light scattering pattern using a specific algorithm.

According to some embodiments, the amount of free stearic acid associated with a stearic acid-treated calcium carbonate composition may be less than about 20% relative to the monolayer concentration. According to other embodiments, the amount of free stearic acid associated with a stearic acid-treated calcium carbonate composition may be less than about 15% free stearic acid. According to further embodiments, the amount of free stearic acid associated with a stearic acid-treated calcium carbonate composition may be less than about 10% free stearic acid, less than about 7% free stearic acid, less than about 6% free stearic acid, less than about 5% free stearic acid, less than about 4% free stearic acid, less than about 3% free stearic acid, less than about 2% free stearic acid, or less than about 1% free stearic acid. In still further embodiments, no free stearic acid may be associated with a stearic acid-treated calcium carbonate composition. "No free stearic acid," as used herein, refers to no stearic acid being detectable by the ToF-SIMS, TGA, and/or DSC techniques described herein.

According to some embodiments, the treated inorganic particulate material and the untreated inorganic particulate material have the same particle size distribution (psd). The psd of the fine particles may be similar to, or the same as, the psd of the coarse portion of the filler composition.

An exemplary filler composition is now described. In some embodiments, the $d_{50}$ ranges from about 2 to about 50 microns; no more than about 0.4 wt % stearic acid is present; and the ratio of the fine treated portion to the coarse untreated portion ranges from 1:99 to 99:1. The fine portion may be treated with stearic acid, silicone oil, siloxane, or silane. For the stearic acid treatment, it is preferred to have reacted stearate on the inorganic particulate material, as it has a higher melting point (311° F.) relative to unreacted (free) stearic acid (157° F.).

In certain embodiments, the treatment level ranges from 0.01 wt % to 5.0 wt %, for example, from 0.1 wt % to 2.5 wt % based on the weight of the inorganic particulate material.

For instance, the fatty acid, salt thereof, or ester thereof may be present in treatment level ranges from 0.1 wt % to 2.5 wt % based on the weight of the inorganic particulate material. The fatty acid, salt thereof, or ester thereof may be present in an amount of not more than 0.2 wt %, not more than 0.3 wt %, not more than 0.4 wt %, not more than 0.5 wt %, not more than 0.6 wt %, not more than 0.7 wt %, not more than 0.8 wt %, not more than 0.9 wt %, not more than 1.0 wt %, not more than 1.1 wt %, not more than 1.2 wt %, not more than 1.25 wt %, not more than 1.3 wt %, not more than 1.4 wt %, not more than 1.5 wt %, not more than 1.6 wt %, not more than 1.7 wt %, not more than 1.8 wt %, not more than 1.9 wt %, not more than 2.0 wt %, not more than 2.1 wt %, not more than 2.2 wt %, not more than 2.3 wt %, not more than 2.4 wt %, or not more than 2.5 wt % based on the weight of the inorganic particulate material.

For instance, the silicone oil, siloxane, or silane may be present in treatment level ranges from 0.01 wt % to 5.0 wt % based on the weight of the inorganic particulate material. The silicon oil, siloxane, or silane may be present in an amount of not more than 0.05 wt %, not more than 0.1 wt %, not more than 0.2 wt %, not more than 0.3 wt %, not more than 0.4 wt %, not more than 0.5 wt %, not more than 0.6 wt %, not more than 0.7 wt %, not more than 0.8 wt %, not more than 0.9 wt %, not more than 1.0 wt %, not more than 1.1 wt %, not more than 1.2 wt %, not more than 1.25 wt %, not more than 1.3 wt %, not more than 1.4 wt %, not more than 1.5 wt %, not more than 1.6 wt %, not more than 1.7 wt %, not more than 1.8 wt %, not more than 1.9 wt %, not more than 2.0 wt %, not more than 2.1 wt %, not more than 2.2 wt %, not more than 2.3 wt %, not more than 2.4 wt %, not more than 2.5 wt %, not more than 3.0 wt %, not more than 3.5 wt %, not more than 4.0 wt %, not more than 4.5 wt %, or not more than 5.0 wt % based on the weight of the inorganic particulate material.

In certain embodiments, the fine treated inorganic particulate material $d_{50}$ ranges from 1 to 15 microns. In other embodiments, the fine treated inorganic particulate material $d_{50}$ ranges from 0.5 to 75 microns, from 1 to 60 microns, from 1 to 50 microns, or from 1 to 30 microns.

In certain embodiments, the ratio of treated inorganic particulate material to untreated inorganic particulate material ranges from about 1:99 to about 99:1, for example, from about 3:97 to about 97:3, 5:95 to about 95:5, from about 10:90 to about 90:10, from about 20:80 to about 80:20, from about 25:75 to about 75:25, or less than about 50:50.

According to some embodiments, the untreated inorganic particulate material $d_{50}$ ranges from 3 to 75 microns, for example, from 10 to 75 microns, from 12 to 75 microns, from 20 to 75 microns, from 25 to 75 microns, from 30 to 75 microns, from 5 to 50 microns, or from 10 to 50 microns.

In some embodiments, the ground calcium carbonate is prepared by attrition grinding. "Attrition grinding," as used herein, refers to a process of wearing down particle surfaces resulting from grinding and shearing stress between the moving grinding particles. Attrition can be accomplished by rubbing particles together under pressure, such as by a gas flow.

In some embodiments, the attrition grinding is performed autogenously, where the calcium carbonate particles are ground only by other calcium carbonate particles.

In some embodiments, the calcium carbonate is ground by the addition of a grinding media other than calcium carbonate. Such additional grinding media can include ceramic particles (e.g., silica, alumina, zirconia, and aluminum silicate), plastic particles, or rubber particles.

In some embodiments, the calcium carbonate is ground in a mill. Exemplary mills include those described in U.S. Pat. Nos. 5,238,193 and 6,634,224, the disclosures of which are incorporated herein by reference. As described in these patents, the mill may comprise a grinding chamber, a conduit for introducing the calcium carbonate into the grinding chamber, and an impeller that rotates in the grinding chamber thereby agitating the calcium carbonate.

In some embodiments, the calcium carbonate is dry ground, where the atmosphere in the mill is ambient air. In some embodiments, the calcium carbonate may be wet ground.

In some embodiments, the blended treated and untreated calcium carbonate may have a range of contact angles from 10 to 150 degrees, from 25 to 125 degrees, from 50 to 100 degrees, or from 90 to 150 degrees, as measured by a test according to ASTM D7334-08. For example, a stearate-treated calcium carbonate may be blended with an untreated calcium carbonate in a ratio (treated:untreated) of 12.5:87.5. The treated calcium carbonate may be treated with 1.15 wt % of stearate and may have a $d_{50}$ value of 3.3 microns, as measured by Microtrac laser light diffraction. The untreated calcium carbonate may have a do value of 22.5 microns, as measured by a SEDIGRAPH 5100. The contact angle of the blended composition may be measured according to ASTM D7334-08. The exemplary blended composition has a contact angle of 93 degrees at 35% relative humidity, and 95.5 degrees at 98% relative humidity.

In some embodiments, a feed calcium carbonate (prior to milling) may comprise calcium carbonate sources chosen from calcite, limestone, chalk, marble, dolomite, or other similar sources. Ground calcium carbonate particles may be prepared by any known method, such as by conventional grinding techniques discussed above and optionally coupled with classifying techniques, e.g., jaw crushing followed by roller milling or hammer milling and air classifying or mechanical classifying.

The ground calcium carbonate may be further subjected to an air sifter or hydrocyclone. The air sifter or hydrocyclone can function to classify the ground calcium carbonate and remove a portion of residual particles greater than 20 microns. According to some embodiments, the classification can be used to remove residual particles greater than 10 microns, greater than 30 microns, greater than 40 microns, greater than 50 microns, or greater than 60 microns. According to some embodiments, the ground calcium carbonate may be classified using a centrifuge, hydraulic classifier, or elutriator.

In some embodiments, the ground calcium carbonate disclosed herein is free of dispersant, such as a polyacrylate. In some embodiments, a dispersant may be present in a sufficient amount to prevent or effectively restrict flocculation or agglomeration of the ground calcium carbonate to a desired extent, according to normal processing requirements. The dispersant may be present, for example, in levels up to about 1% by weight. Examples of dispersants include polyelectrolytes such as polyacrylates and copolymers containing polyacrylate species, especially polyacrylate salts (e.g., sodium and aluminum optionally with a group II metal salt), sodium hexametaphosphates, non-ionic polyol, polyphosphoric acid, condensed sodium phosphate, non-ionic surfactants, alkanolamine, and other reagents commonly used for this function.

A dispersant may be selected from conventional dispersant materials commonly used in the processing and grinding of inorganic particulate materials, such as calcium carbonate. Such dispersants will be recognized by those skilled in the art. Dispersants are generally water-soluble salts capable of supplying anionic species, which in their effective amounts may adsorb on the surface of the inorganic particles and thereby inhibit aggregation of the particles. The unsolvated salts may suitably include alkali metal cations, such as sodium. Solvation may in some cases be assisted by making the aqueous suspension slightly alkaline. Examples of suitable dispersants also include water soluble condensed phosphates, for example, polymetaphosphate salts (general form of the sodium salts: $(NaPO_3)_x$), such as tetrasodium metaphosphate or so-called "sodium hexametaphosphate" (Graham's salt); water-soluble salts of polysilicic acids; polyelectrolytes; salts of homopolymers or copolymers of acrylic acid or methacrylic acid; and/or salts of polymers of other derivatives of acrylic acid, suitably having a weight average molecular mass of less than about 20,000. Sodium hexametaphosphate and sodium polyacrylate, the latter suitably having a weight average molecular mass in the range of about 1,500 to about 10,000, are preferred.

In certain embodiments, the production of the ground calcium carbonate includes using a grinding aid, such as propylene glycol, or any grinding aid known to those skilled in the art.

According to some embodiments, the ground calcium carbonate may be combined with a base material. The base material may be selected from the group of materials consisting of geopolymer, water, polymer, and combinations thereof.

As used in this disclosure, the terms "polymer," "resin," "polymeric resin," and derivations of these terms may be used interchangeably.

According to some embodiments, the polymeric resin is chosen from conventional polymeric resins that provide the properties desired for any particular covering product or other applications.

According to some embodiments, the polymeric resin may be a thermoplastic polymer, including but not limited to, a polyolefin, such as, for example, polypropylene and polyethylene homopolymers and copolymers, including copolymers with 1-butene, 4-methyl-1-pentene, and 1-hexane; polyamides, such as nylon; polyesters; and copolymers of any of the above-mentioned polymers. Examples of thermoplastic polymers may also include polyolefin homopolymers or copolymers (e.g., low density or high density polyethylenes, linear polyethylenes, polypropylenes, ethylene-propylene copolymers, ethylene(vinyl acetate) copolymers, and ethylene-(acrylic acid) copolymers, halogenated polyethylenes (such as chlorinated polyethylene), polybutene, polymethylbutene, polyisobutylene, polystyrenes and polystyrene derivatives (e.g., SB, ABS, SA, and SBS rubbers), PVCs, polycarbonates, polysulphones, polyether sulphones, PEEK, saturated polyesters (e.g., polyethylene terephthalates and/or polybutylene terephthalates), and polyphenylene oxides and blends, mixtures or copolymers containing these species.

According to some embodiments, the polymeric resin may include an isotropic semi-crystalline polymer. An isotropic semi-crystalline polymer may be melt-processable, melting in a temperature range that makes it possible to spin the polymer into fibers in the melt phase without significant decomposition. Exemplary isotropic semi-crystalline polymers may include, but are not limited to, poly(alkylene terephthalates), poly(alkylene naphthalates), poly(arylene sulfides), aliphatic and aliphatic-aromatic polyamides, polyesters comprising monomer units derived from cyclohexanedimethanol and terephthalic acid, poly(ethylene terephthalate), poly(butylene terephthalate), poly(ethylene naphthalate), poly(phenylene sulfide), and poly(1,4-cyclohexanedimethanol terephthalate), wherein the 1,4-cyclohexanedimethanol may be a mixture of cis- and trans-isomers, nylon-6, and nylon-66.

According to some embodiments, the polymeric resin may include a semi-crystalline polymer polyolefin, including but not limited to, semi-crystalline polyethylene and polypropylene. According to some embodiments, the polymeric resin may include an extended chain polyethylene having a high tensile modulus, made by the gel spinning or the melt spinning of very or ultrahigh molecular weight polyethylene.

According to some embodiments, isotropic polymers that cannot be processed in the melt may also be used as the polymeric resin. For example, the isotropic polymer may include RAYON®, cellulose acetate, polybenzimidazole, poly[2,2'-(m-phenylene)-5,5'-bibenzimidazole]. According to some embodiments, isotropic polymers may be dry spun using acetone; N,N'-dimethylacetamide; or polar aprotic solvents, including but not limited to N-methylpyrrolidinone as a solvent.

According to some embodiments, the polymeric resin may include a liquid crystalline polymer (LCP). LCPs may generally produce fibers with high tensile strength and/or modulus. According to some embodiments, the LCP may be processable in the melt (i.e., thermotropic). According to some embodiments, LCPs that exhibit liquid crystalline behavior in solution may be blended with a hard filler, and then wet or dry spun to yield monofilament fibers. According to some embodiments, the liquid crystalline polymer may include any aromatic polyamide that is soluble in polar aprotic solvents, including, but not limited to, N-methylpyrrolidinone, and that can be spun into monofilament fibers. According to some embodiments, an aromatic polyamide made from p-phenylenediamine and terephthalic acid (including, but not limited to, polymers sold under the KEVLAR® trademark) can be filled and wet spun to yield monofilament fibers. According to some embodiments, the liquid crystalline polymer may not be liquid crystalline under some or all of a given condition or set of conditions, but may still yield high modulus fibers. According to some embodiments, the liquid crystalline polymer may exhibit lyotropic liquid crystalline phases at some concentrations and in some solvents, but isotropic solutions at other concentrations and/or in other solvents.

According to some embodiments, the liquid crystalline polymers (LCPs) may include thermotropic LCPs. Exemplary thermotropic LCPs include, but are not limited to, aromatic polyesters, aliphatic-aromatic polyesters, aromatic poly(esteramides), aliphatic-aromatic poly(esteramides), aromatic poly(esterimides), aromatic poly(estercarbonates), aromatic polyamides, aliphatic-aromatic polyamides and poly(azomethines). According to some embodiments, the thermotropic LCPs are aromatic polyesters and poly(esteramides) that form liquid crystalline melt phases at temperatures less than about 360° C. and include one or more monomer units derived from the group consisting of terephthalic acid, isophthalic acid, 1,4-hydroquinone, resorcinol, 4,4'-dihydroxybiphenyl, 4,4'-biphenyldicarboxylic acid, 4-hydroxybenzoic acid, 6-hydroxy-2-naphthoic acid, 2,6-naphthalenedicarboxylic acid, 2,6-dihydroxynaphthalene, 4-aminophenol, and 4-aminobenzoic acid. According to some embodiments, the aromatic groups may include substituents that do not react under the conditions of the polymerization, such as lower alkyl groups having 1-4 carbons, aromatic groups, F, Cl, Br, and I.

According to some embodiments, the LCPs may have monomer repeat units derived from 4-hydroxybenzoic acid and 6-hydroxy-2-naphthoic acid in a ratio in the range from about 15:85 to about 85:15 on a mole basis, such as, for example, in the range from about 27:73 to about 73:27 on a mole basis, or from about 40:60 to about 60:40 on a mold basis.

Additional polymeric resins, such as those described in International Publication No. WO 2009/094321 may also be used.

In certain embodiments, the geopolymer materials may comprise calcium silicate, silico-oxide (—Si—O—Si—O—), silico-aluminate (—Si—O—Al—O—), ferro-silico-aluminate (—Fe—O—Si—O—Al—O—) or alumino-phosphate, or mixtures thereof.

EXAMPLES

Figure 1:
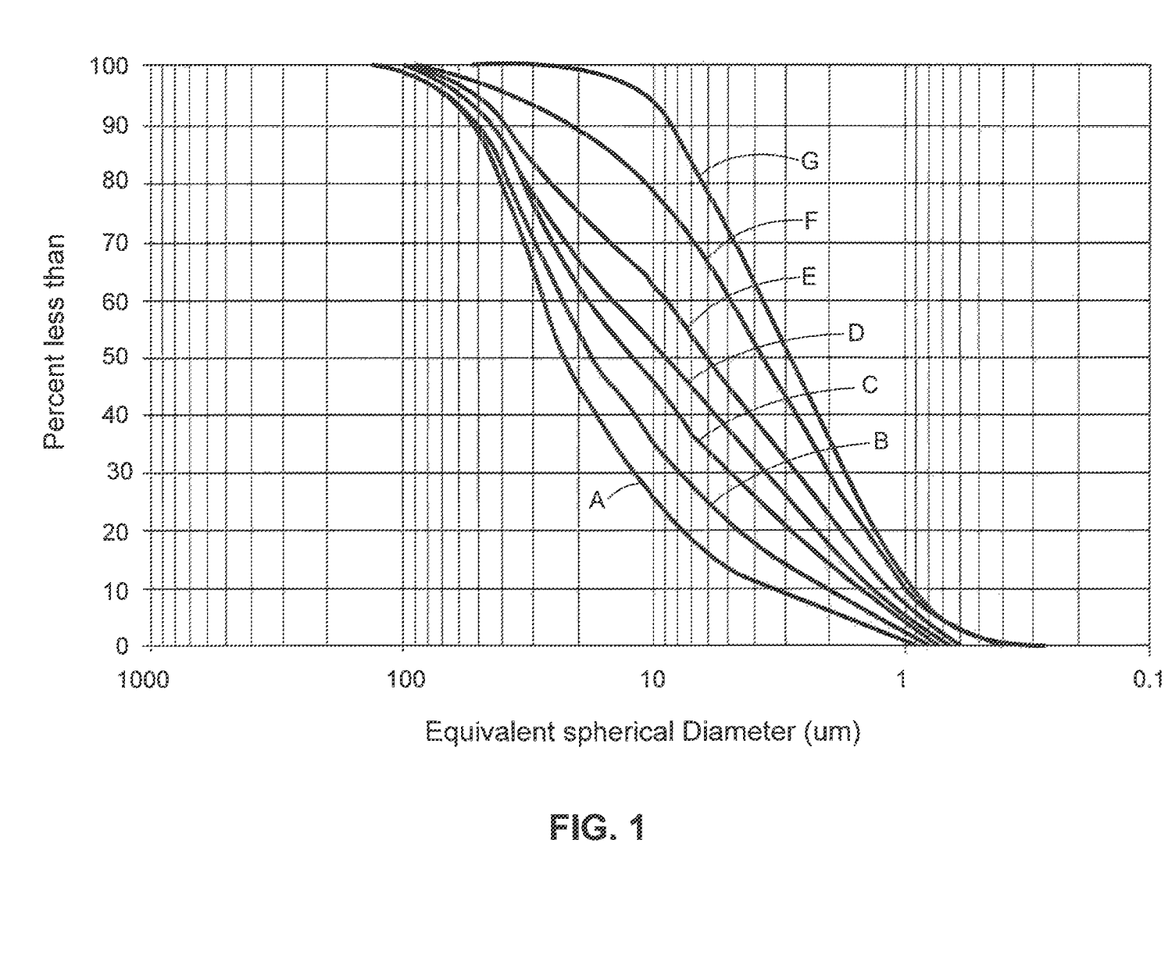
FIG. 1 shows the particle size distribution for exemplary inorganic particulate material filler samples.

FIG. 1 shows the particle size distributions for an exemplary first inorganic particulate material filler (ground calcium carbonate), a second, surface-treated inorganic particulate mineral filler (ground calcium carbonate), and five blends of the first and second inorganic particulate material fillers. Line A represents the particle size distribution of the exemplary first inorganic particulate material filler having a median particle size of about 20 microns. Line G represents the particle size distribution of the exemplary second inorganic particulate material filler having a median particle size of about 3 microns. The exemplary second inorganic particulate material has been treated with stearic acid. Lines B through F represent the respective particle size distributions of exemplary blends of the first and second inorganic particulate material fillers having the following respective amounts of the second inorganic particulate material filler: Line B—12.5%; Line C—25%; Line D—37.5%; Line E—50%; and Line F—62.5%.

Figure 2:
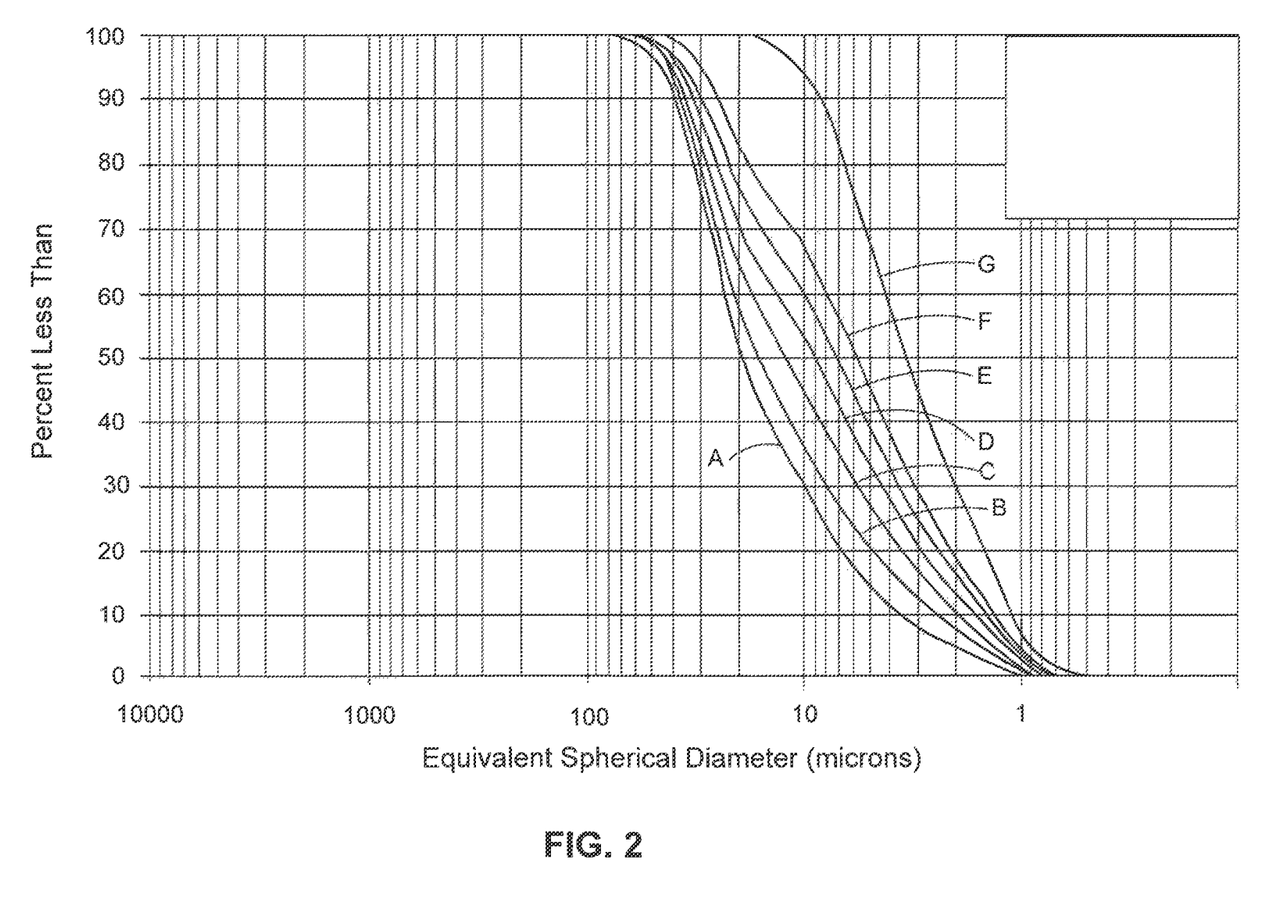
FIG. 2 shows the particle size distribution for exemplary inorganic particulate material filler samples.

FIG. 2 shows the particle size distributions for an exemplary first inorganic particulate material filler (ground calcium carbonate), a second, surface-treated inorganic particulate mineral filler (ground calcium carbonate), and five blends of the first and second inorganic particulate material fillers. Line A represents the particle size distribution of the exemplary first inorganic particulate material filler having a median particle size of about 20 microns. Line G represents the particle size distribution of the exemplary second inorganic particulate material filler having a median particle size of about 3 microns. The exemplary second inorganic particulate material has been treated with stearic acid. Lines B through F represent the respective particle size distributions of exemplary blends of the first and second inorganic particulate material fillers having the following respective amounts of the second inorganic particulate material filler: Line B—10%; Line C—20%; Line D—30%; Line E—40%; and Line F—50%.

Figure 3:
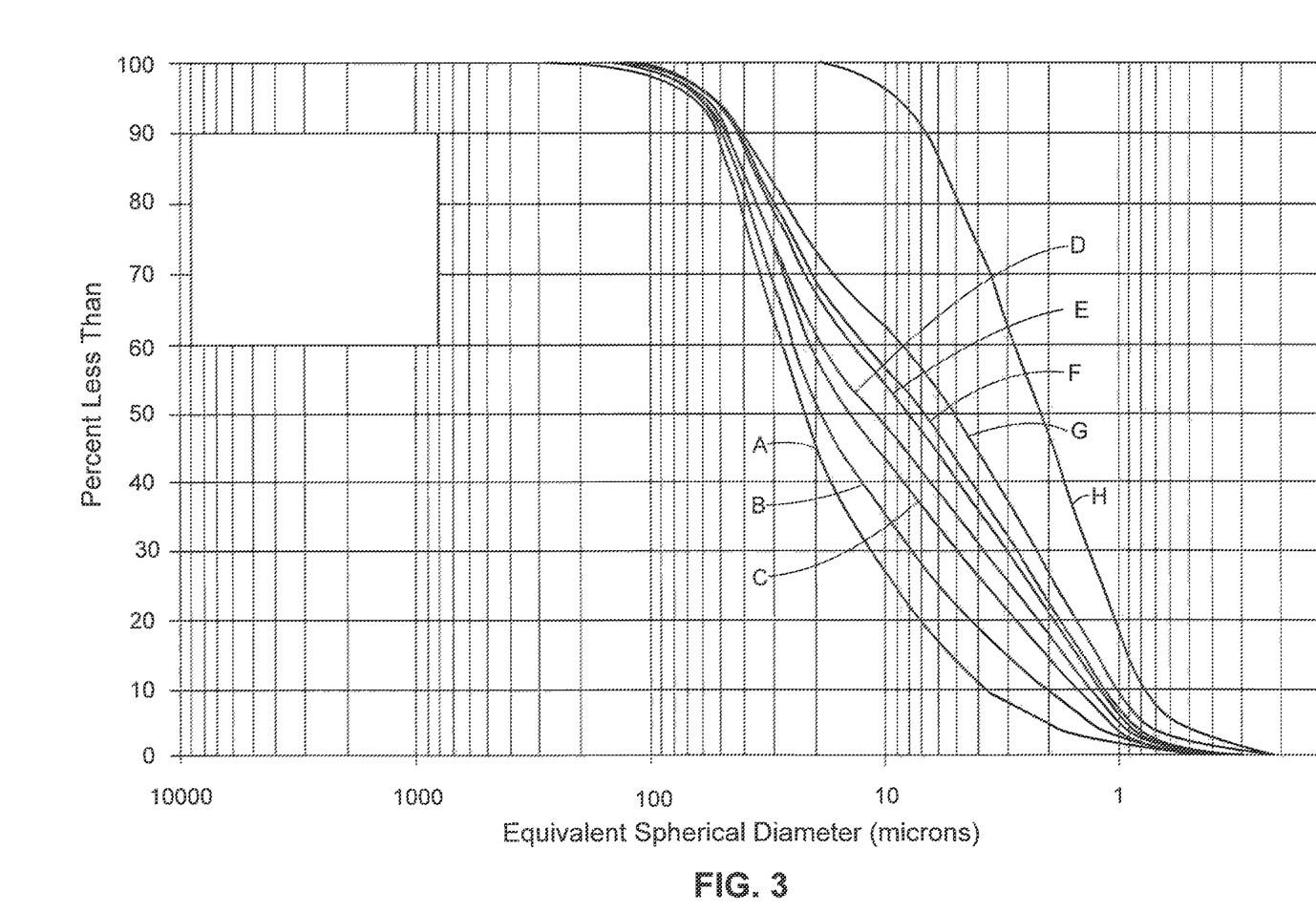
FIG. 3 shows the particle size distribution for eight exemplary inorganic particulate material filler samples.

Eight exemplary inorganic particulate material filler samples were prepared and tested for oil absorption. Table 1 below shows the content of the eight samples and the corresponding oil absorption for each of the samples in grams of oil needed to wet 100 grams of the corresponding sample. FIG. 3 shows the particle size distributions for the eight samples, including an exemplary first inorganic particulate material filler (100%), an exemplary second, surface-treated inorganic particulate mineral filler (100%), and six blends of the first and second inorganic particulate material fillers. Line A represents the particle size distribution of the exemplary first inorganic particulate material filler (ground calcium carbonate) having a median particle size of about 20 microns. Exemplary first inorganic particulate material filler of Line A is untreated. Line H represents the particle size distribution of the exemplary second inorganic particulate material filler (ground calcium carbonate) having a median particle size of about 3 microns. The exemplary second inorganic particulate material has been surface-treated with stearic acid. Lines B through G represent the respective particle size distributions of exemplary blends of the first and second inorganic particulate material fillers blended in the following ratios of first inorganic particulate material filler to second inorganic particulate material filler: Line B—90:10; Line C—80:20; Line D—70:30; Line E—65:35; Line F—60:40; and Line G—50:50.

TABLE 1

| Sample | Percentage of first inorganic particulate material filler - 20 micron, untreated | Percentage of second inorganic particulate material filler - 3 micron, surface-treated | Oil absorption - grams of oil per 100 grams of filler wetted |
| --- | --- | --- | --- |
| A | 100 | 0 | 17 |
| B | 90 | 10 | 14 |
| C | 80 | 20 | 12 |
| D | 70 | 30 | 10 |
| E | 65 | 35 | 10 |
| F | 60 | 40 | 10 |
| G | 50 | 50 | 12 |
| H | 0 | 100 | 16 |

Examples A through H shown in FIG. 3 were tested for oil absorption according to ASTM D-281. Testing for oil absorption according to ASTM-281 determines the number of grams of oil required to wet 100 grams of the tested material. The oil absorption of a filler material is believed to correlate directly with resin demand of the filler material. Thus, if the oil absorption characteristic of the filler material is lower, the resin demand of the filler material would be expected to be lower as well. A filler material having a lower resin demand may be preferable to a filler material having a higher resin demand because a composition including the filler material and a polymer may include a greater percentage of the filler material relative to the polymer if the filler material has a lower resin demand. Thus, a composition including the filler material having a lower resin demand may make up a greater percentage of the composition while still maintaining other desirable material characteristics, such as, for example, water resistance and dimensional integrity, thereby potentially reducing the cost of the composition including the filler material, such as, for example, a covering product such as vinyl flooring (e.g., luxury vinyl flooring). Also, or alternatively, the composition including the filler material may have improved flexural strength and/or impact strength, dimensional stability, thermoconductivity increase, and/or equivalent stiffness thinner material of the covering product.

Figure 4:
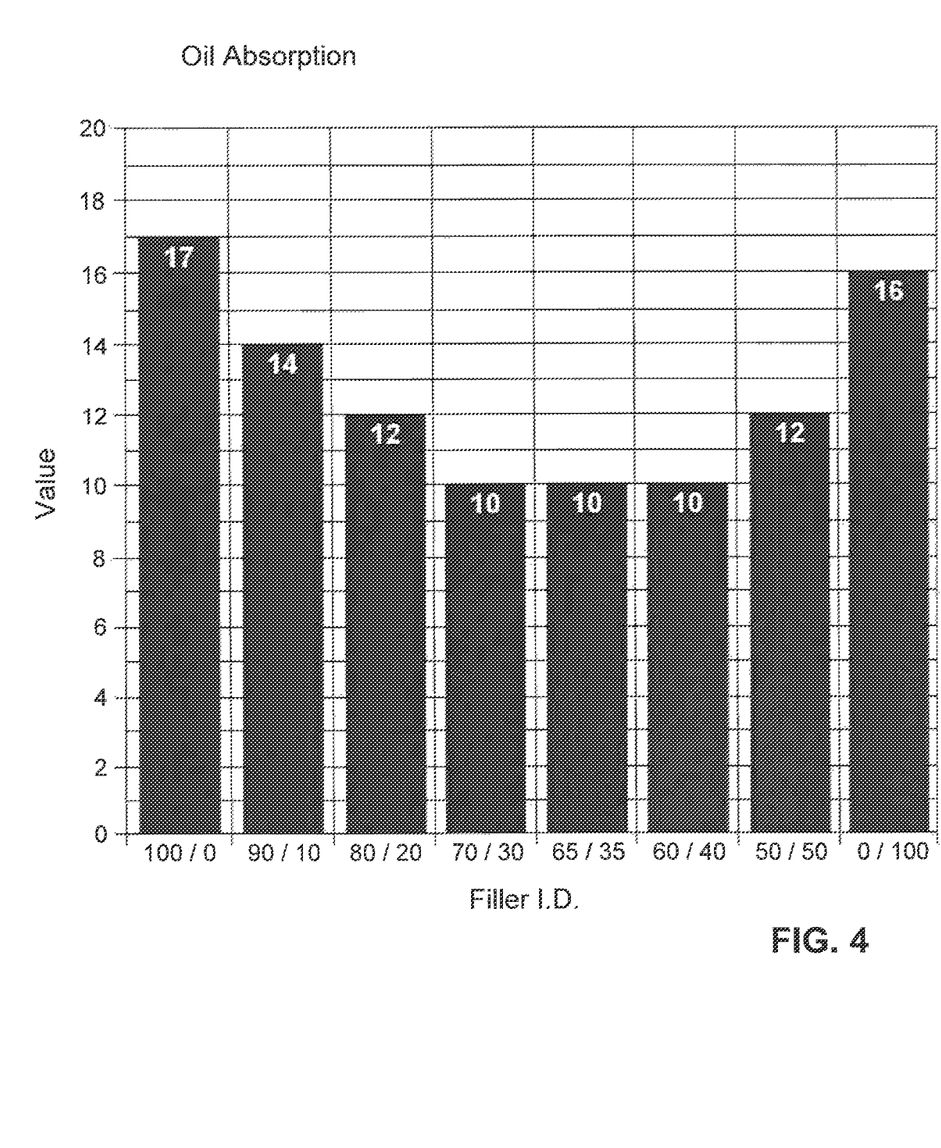
FIG. 4 shows oil absorption test results according to ASTM D-281 of the eight exemplary inorganic particulate material filler samples shown in FIG. 3.

As shown in Table 1 and FIG. 4, which is a bar graph of the oil absorption test results for the eight samples, samples D through F have the lowest oil absorption at 10 grams of oil per 100 grams of sample wetted. Thus, the samples having blend ratios of first in organic particulate material filler to second inorganic particulate material filler ranging from 70:30 to 60:40 have the lowest oil absorption. Samples C and G have the next lowest oil absorption at 12 grams of oil per 100 grams of sample wetted, with a ratio range of 80:20 to 50:50. Sample B has the next lowest oil absorption of 14 grams of oil per 100 grams of sample wetted, for a sample blend ratio of 90:10. Sample H containing 100% of the second inorganic particulate material (3 micron, stearic-acid treated GCC), has the next lowest oil absorption of 16 grams of oil per 100 grams sample wetted, which is slightly lower than sample A containing 100% of the first inorganic particulate material filler (20 micron untreated GCC) and has an oil absorption of 17 grams of oil per 100 grams of sample wetted.

Based on these results, relative to sample A, the untreated 20 micron GCC, samples D through F exhibit about a 40% reduction in oil absorption. Samples C and G exhibit about a 30% reduction in oil absorption, sample B exhibits slightly less than a 20% reduction, and sample H exhibits a slight reduction in oil absorption.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A mineral filler composition for use in covering products, the mineral filler composition comprising:
    a first inorganic particulate material filler having an average particle size ranging from 10 to 40 microns; and
    a second inorganic particulate material filler having an average particle size ranging from 1 to 5 microns, wherein
    the first inorganic particulate material filler is non-hydrophobic;
    the second inorganic particulate material filler is hydrophobic due to treatment with at least one of fatty acids, salts thereof, esters thereof, silicone oil, silane, and/or siloxane; and
    a blend ratio of the first inorganic particulate material filler to the second inorganic particulate material filler ranges from 70:30 to 60:40.

2. The composition of claim 1, wherein the mineral filler composition has a lower oil absorption relative to a mineral filler composition that does not include a hydrophobic inorganic particulate material filler.

3. The composition of claim 1, wherein the mineral filler composition has at least a 20 percent lower oil absorption relative to a mineral filler composition that does not include a hydrophobic inorganic particulate material filler.

4. The composition of claim 1, wherein the mineral filler composition has at least a 40 percent lower oil absorption relative to a mineral filler composition that does not include a hydrophobic inorganic particulate material filler.

5. The composition of claim 1, wherein the mineral filler composition has an oil absorption ranging from 9 to 16 grams of oil per 100 grams of the mineral filler composition.

6. The composition of claim 1, wherein the mineral filler composition has an oil absorption ranging from 9 to 15 grams of oil per 100 grams of the mineral filler composition.

7. The composition of claim 1, wherein the mineral filler composition has an oil absorption ranging from 9 to 14 grams of oil per 100 grams of the mineral filler composition.

8. The composition of claim 1, wherein the mineral filler composition has an oil absorption ranging from 9 to 11 grams of oil per 100 grams of the mineral filler composition.

9. The composition of claim 1, wherein at least one of the first inorganic particulate mineral filler and the second inorganic particulate mineral filler comprises calcium carbonate.

10. The composition of claim 1, wherein at least one of the first inorganic particulate mineral filler and the second inorganic particulate mineral filler comprises ground calcium carbonate.

11. The composition of claim 1, wherein the first particulate mineral filler is treated with stearic acid.

12. The composition of claim 1, wherein the average particle size of the first inorganic particulate mineral filler ranges from 20 to 40 microns.

13. The composition of claim 1, wherein the average particle size of the first inorganic particulate mineral filler ranges from 30 to 40 microns.

14. A mineral filler composition for use in covering products, the mineral filler composition comprising:
    a first inorganic particulate material filler having an average particle size ranging from 10 to 40 microns and being non-hydrophobic; and
    a second inorganic particulate material filler having an average particle size ranging from 1 to 5 microns and being hydrophobic, and
    wherein a blend ratio of the first inorganic particulate material filler to the second inorganic particulate material filler ranges from 70:30 to 60:40.

15. The composition of claim 14, wherein the average particle size of the second inorganic particulate mineral filler ranges from 1 to 3 microns.

16. A mineral filler composition for use in covering products, the mineral filler composition comprising:
    a first inorganic particulate material filler having an average particle size ranging from 10 to 40 microns; and
    a second inorganic particulate material filler having an average particle size ranging from 1 to 5 microns,
    wherein at least one of the first and second inorganic particulate material fillers is hydrophobic;
    the second inorganic particulate material filler is treated with stearic acid;
    a blend ratio of the first inorganic particulate material filler to the second inorganic particulate material filler ranges from 70:30 to 60:40; and
    the first and second inorganic particulate material fillers are each ground calcium carbonate.

* * * * *